United States Patent
Gaither (10) Patent No.: US 9,874,264 B2
(45) Date of Patent: Jan. 23, 2018

(54) MAGNETIC FIELD ACTIVATED POWERTRAIN MOUNT

(71) Applicant: Toyota Motor Engineering & Manufacturing North America, Inc., Erlanger, KY (US)

(72) Inventor: Geoffrey D. Gaither, Torrance, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/944,732

(22) Filed: Nov. 18, 2015

(65) Prior Publication Data
US 2017/0138434 A1 May 18, 2017

(51) Int. Cl.
*F16F 13/00* (2006.01)
*B60K 5/12* (2006.01)
*F16F 13/30* (2006.01)

(52) U.S. Cl.
CPC .......... *F16F 13/002* (2013.01); *B60K 5/1208* (2013.01); *B60K 5/1283* (2013.01);
(Continued)

(58) Field of Classification Search
CPC .... F16F 13/002; F16F 13/305; F16F 2222/06; F16F 2222/12; B60K 5/1208; B60K 5/1292
(Continued)

(56) References Cited

U.S. PATENT DOCUMENTS 4,300,649 A * 11/1981 Sakata ..................... B60K 5/04
180/291
4,487,287 A * 12/1984 Watanabe ............ B60K 5/1208
180/297
(Continued)

FOREIGN PATENT DOCUMENTS

EP 0119626 A2 9/1984

OTHER PUBLICATIONS

Muller et al., "Reduction of Noise and Vibration in Vehicles by an Appropriate Engine Mount System and Active Absorbers", SAE Technical Paper Series, International Congress & Exposition, Feb. 26-29, 1996, 14 pages, Detroit, MI.
(Continued)

*Primary Examiner* — James A Shriver, II
*Assistant Examiner* — Brian L Cassidy
(74) *Attorney, Agent, or Firm* — Christopher G. Darrow; Darrow Mustafa PC (57) ABSTRACT

A powertrain mount is connectable between a vehicle's powertrain component and body structure. The powertrain mount includes a moveable core and a housing for the moveable core. The housing supports the moveable core for movement relative to the housing, in one or more open degrees of freedom, to one or more floating poses where the moveable core is rigidly mechanically decoupled from the housing in the open degrees of freedom. A magnetic field generation system includes one or more housing-side magnetic devices at the housing and one or more moveable-core-side magnetic devices at the moveable core. The housing-side magnetic devices and the moveable-core-side magnetic devices are configured to collectively generate mutually balanced magnetic fields between the housing and the moveable core in the open degrees of freedom that
(Continued)

retentively locate the moveable core in one or more floating poses.

20 Claims, 5 Drawing Sheets (52) U.S. Cl.
CPC ........ *F16F 13/305* (2013.01); *F16F 2222/06* (2013.01); *F16F 2222/12* (2013.01)

(58) Field of Classification Search
USPC .......................................................... 180/291
See application file for complete search history.

(56) References Cited

U.S. PATENT DOCUMENTS

| | | | | |
|---|---|---|---|---|
| 4,624,435 A * | 11/1986 | Freudenberg | ........... | F16F 15/03 180/300 |
| 4,669,711 A * | 6/1987 | Beer | ........ | F16F 6/00 188/267 |
| 4,725,046 A * | 2/1988 | Sugino | ...... | F16F 6/00 188/267 |
| 4,869,476 A * | 9/1989 | Shtarkman | ............ | F16F 13/30 188/267.1 |
| 5,176,368 A * | 1/1993 | Shtarkman | ........... | F16F 13/16 188/267.2 |
| 5,427,362 A * | 6/1995 | Schilling | ............... | H02K 33/18 188/267 |
| 5,492,312 A * | 2/1996 | Carlson | .................. | F16F 9/535 188/267.2 |
| 6,053,272 A * | 4/2000 | Koyanagi | ............ | B60K 5/1208 180/228 |
| 6,095,486 A * | 8/2000 | Ivers | ................ | F16F 9/46 137/909 |
| 6,386,309 B1 * | 5/2002 | Park | ................... | B60K 5/1216 180/291 |
| 6,460,822 B1 * | 10/2002 | Lee | .................... | B60K 5/1208 248/635 |
| 6,499,570 B2 * | 12/2002 | Chu | .................... | F16F 13/002 188/129 |
| 6,622,995 B2 * | 9/2003 | Baudendistel | ........ | F16F 13/305 267/140.14 |
| 6,722,463 B1 * | 4/2004 | Reese | ................... | B60K 5/12 180/292 |
| 6,962,229 B2 * | 11/2005 | Miyahara | ............ | B60K 5/1208 180/291 |
| 7,063,191 B2 * | 6/2006 | Hopkins | ............... | F16F 13/305 188/267.2 |
| 7,360,620 B2 * | 4/2008 | Takenaka | ............ | B62K 11/10 180/219 |
| 8,069,944 B2 * | 12/2011 | Fell | ........................ | B60K 5/12 180/291 |
| 8,104,591 B2 * | 1/2012 | Barefoot | ................... | F16F 9/34 188/267.2 |
| 8,152,145 B2 * | 4/2012 | Anderson | ............... | F16F 1/361 188/267.2 |
| 8,191,669 B2 | 6/2012 | Verbrugge | | |
| 8,397,856 B2 * | 3/2013 | Gruen | ................... | B60K 5/1208 180/291 |
| 8,511,416 B2 * | 8/2013 | Hiruma | ................... | B60K 1/00 180/291 |
| 8,522,909 B2 * | 9/2013 | Niina | ........................ | B60K 1/00 180/291 |
| 8,523,136 B2 * | 9/2013 | Patel | .................... | B60K 5/1208 180/312 |
| 8,579,269 B2 * | 11/2013 | Takakura | ............ | B60K 5/1208 267/140.13 |
| 8,616,536 B2 | 12/2013 | Kim et al. | | |
| 8,727,063 B1 * | 5/2014 | Yamamoto | ........... | B60K 5/1216 180/291 |
| 8,770,513 B2 * | 7/2014 | Barber | .................. | B64D 27/26 180/291 |
| 8,853,976 B2 * | 10/2014 | Shin | ........................ | F16F 15/03 318/115 |
| 9,016,446 B2 * | 4/2015 | Mankame | ................. | F16F 6/00 188/267 |
| 9,091,323 B2 * | 7/2015 | Kim | ...................... | F16F 13/305 |
| 9,158,868 B2 * | 10/2015 | Jomaa | .................... | G06F 17/50 |
| 9,205,733 B2 * | 12/2015 | Olsen | .................. | B60K 5/1208 |
| 9,242,541 B2 * | 1/2016 | Kim | ...................... | B60K 5/1208 |
| 9,283,839 B2 * | 3/2016 | Andersson | ............ | B62D 21/09 |
| 9,470,287 B2 * | 10/2016 | Satori | .................. | F16F 13/101 |
| 9,506,522 B2 * | 11/2016 | Komiya | ................. | F16F 13/106 |
| 2002/0029920 A1 * | 3/2002 | Fournier | .................. | B60K 5/12 180/300 |
| 2004/0188165 A1 * | 9/2004 | Miller | .................... | F16F 15/02 180/291 |
| 2004/0195033 A1 * | 10/2004 | Kim | .................... | B60K 5/1208 180/291 |
| 2005/0199775 A1 * | 9/2005 | Kaminski | ............... | F16F 1/371 248/638 |
| 2005/0217918 A1 * | 10/2005 | Endo | ...................... | F16F 1/387 180/291 |
| 2007/0199742 A1 * | 8/2007 | Miyahara | ................. | B60K 5/04 180/58 |
| 2008/0054538 A1 * | 3/2008 | Igami | ................... | B60K 5/1216 267/140.11 |
| 2009/0166506 A1 * | 7/2009 | Ahmed | ............... | B60K 5/1208 248/634 |
| 2009/0309279 A1 * | 12/2009 | Kim | ....................... | F16F 13/20 267/140.11 |
| 2011/0180980 A1 * | 7/2011 | Urayama | ............... | F16F 7/1011 267/140.14 |
| 2011/0316363 A1 * | 12/2011 | Kim | ....................... | F16F 7/1011 310/28 |
| 2012/0211318 A1 * | 8/2012 | Ac | ........................ | B60G 17/08 188/283 |
| 2012/0267185 A1 * | 10/2012 | Hirai | ....................... | B60G 7/02 180/291 |
| 2014/0090937 A1 * | 4/2014 | Wereley | .................. | B64C 27/51 188/267.2 |
| 2014/0137830 A1 * | 5/2014 | Satou | .................... | F16F 1/3849 123/192.2 |
| 2014/0196963 A1 * | 7/2014 | Salomons | ................ | B60K 5/12 180/54.1 |
| 2015/0360548 A1 * | 12/2015 | Merkel | ............... | B60L 11/1877 180/291 |
| 2016/0108988 A1 * | 4/2016 | Kim | ...................... | F16F 13/262 267/140.11 |
| 2016/0116018 A1 * | 4/2016 | Yoshii | ..................... | F16F 1/371 267/141 |
| 2016/0129775 A1 * | 5/2016 | Smith | ..................... | B60K 5/12 180/233 |
| 2016/0131219 A1 * | 5/2016 | Ueki | ..................... | F16F 13/107 267/140.13 |
| 2016/0138670 A1 * | 5/2016 | Pfingst | .................. | F16F 13/102 267/140.13 |
| 2016/0185204 A1 * | 6/2016 | Lemaire | .................. | F16F 13/10 180/291 |
| 2016/0186831 A1 * | 6/2016 | Furusawa | ............. | F16F 13/105 267/140.13 |
| 2016/0201756 A1 * | 7/2016 | Sakamoto | ............. | F16F 1/3849 248/634 |

OTHER PUBLICATIONS

Elahinia et al., "MR- and ER-Based Semiactive Engine Mounts: A Review", 2013, Smart Materials Research, vol. 2013, 22 pages, Hindawi Publishing Corporation.

Hong et al., "Vibration Control of a Structural System Using Magneto-Rheological Fluid Mount", Journal of Intelligent Material Systems and Structures, Nov./Dec. 2005, pp. 931-936 (6 pages), vol. 16, SAGE Publications.

* cited by examiner

MAGNETIC FIELD ACTIVATED POWERTRAIN MOUNT

TECHNICAL FIELD

The embodiments disclosed herein generally relate to vehicles and their powertrain components, and more particularly to mounts for their powertrain components.

BACKGROUND

Most vehicles have an engine compartment housing powertrain components such as an engine, a motor/generator and a transmission. The powertrain components are typically mounted to a body structure that encloses the engine compartment. The powertrain components may be subject to movement either as a product of their own operation or as a product of the operation of the vehicle, or both. In order to attenuate or otherwise manage the transfer of their movement to the body structure, and to the remainder of the vehicle, these powertrain components are sometimes mounted to the body structure with one or more mounts.

SUMMARY

Disclosed herein are embodiments of powertrain mounts and magnetic field generation systems for activating the powertrain mounts. In one aspect, a system for managing the transfer of the movement of a vehicle's powertrain component to its body structure includes a powertrain mount and a magnetic field generation system. The powertrain mount is connectable between a vehicle's powertrain component and body structure. The powertrain mount includes a moveable core and a housing for the moveable core. The housing supports the moveable core for movement relative to the housing, in one or more open degrees of freedom, to one or more floating poses where the moveable core is rigidly mechanically decoupled from the housing in the open degrees of freedom. The magnetic field generation system includes one or more housing-side magnetic devices at the housing and one or more moveable-core-side magnetic devices at the moveable core. The housing-side magnetic devices and the moveable-core-side magnetic devices are configured to collectively generate mutually balanced magnetic fields between the housing and the moveable core in the open degrees of freedom that retentively locate the moveable core in one or more floating poses.

In another aspect, a vehicle includes a body structure enclosing an engine compartment, a powertrain component housed in the engine compartment and a powertrain mount supporting the powertrain component with respect to the body structure. The powertrain mount includes a moveable core and a housing for the moveable core. The moveable core has a moveable-core-side connection portion connected to one of the body structure or the powertrain component. The housing has a housing-side connection portion connected to the other of the body structure or the powertrain component, and supports the moveable core for movement relative to the housing, in one or more open degrees of freedom, to one or more floating poses where the moveable core is rigidly mechanically decoupled from the housing in the open degrees of freedom. The vehicle further includes a magnetic field generation system. The magnetic field generation system includes one or more housing-side magnetic devices at the housing and one or more moveable-core-side magnetic devices at the moveable core. The housing-side magnetic devices and the moveable-core-side magnetic devices are configured to collectively generate mutually balanced magnetic fields between the housing and the moveable core in the open degrees of freedom that retentively locate the moveable core in one or more floating poses.

In yet another aspect, a system for managing the transfer of the movement of a vehicle's powertrain component to its body structure includes a powertrain mount and a magnetic field generation system. The powertrain mount includes a moveable core and a housing for the moveable core. The moveable core has a moveable-core-side connection portion configured for connection to one of a vehicle's body structure or powertrain component. The housing has a housing-side connection portion configured for connection to the other of the vehicle's body structure or powertrain component, and supports the moveable core for movement relative to the housing, in one or more open degrees of freedom, to one or more floating poses where the moveable core is rigidly mechanically decoupled from the housing in the open degrees of freedom. The magnetic field generation system includes one or more housing-side electromagnets at the housing, one or more moveable-core-side electromagnets at the moveable core and a computing device in communication with the housing-side electromagnets and the moveable-core-side electromagnets. The computing device is configured to control the actuation of the housing-side electromagnets and the moveable-core-side electromagnets to generate, at least in part, mutually balanced magnetic fields between the housing and the moveable core in the open degrees of freedom that retentively locate the moveable core in one or more floating poses.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches an engine mount used in a vehicle to mount its engine to its body structure. The engine mount has a housing supporting an inner moveable core for movement relative to the housing and the remainder of the engine mount. With one of the housing or the moveable core being connected to the body structure, and the other of the housing or the moveable core being connected to the engine, the engine mount supports the engine with respect to the body structure. The vehicle includes a magnetic field generation system that generates magnetic fields between the housing and the moveable core that locate the moveable core relative to the housing to manage the transfer of the engine's movement to the body structure. This management may include either attenuating the transfer of the engine's movement to the body structure or promoting the transfer of the engine's movement to the body structure, or both.

Figures 1, 2:
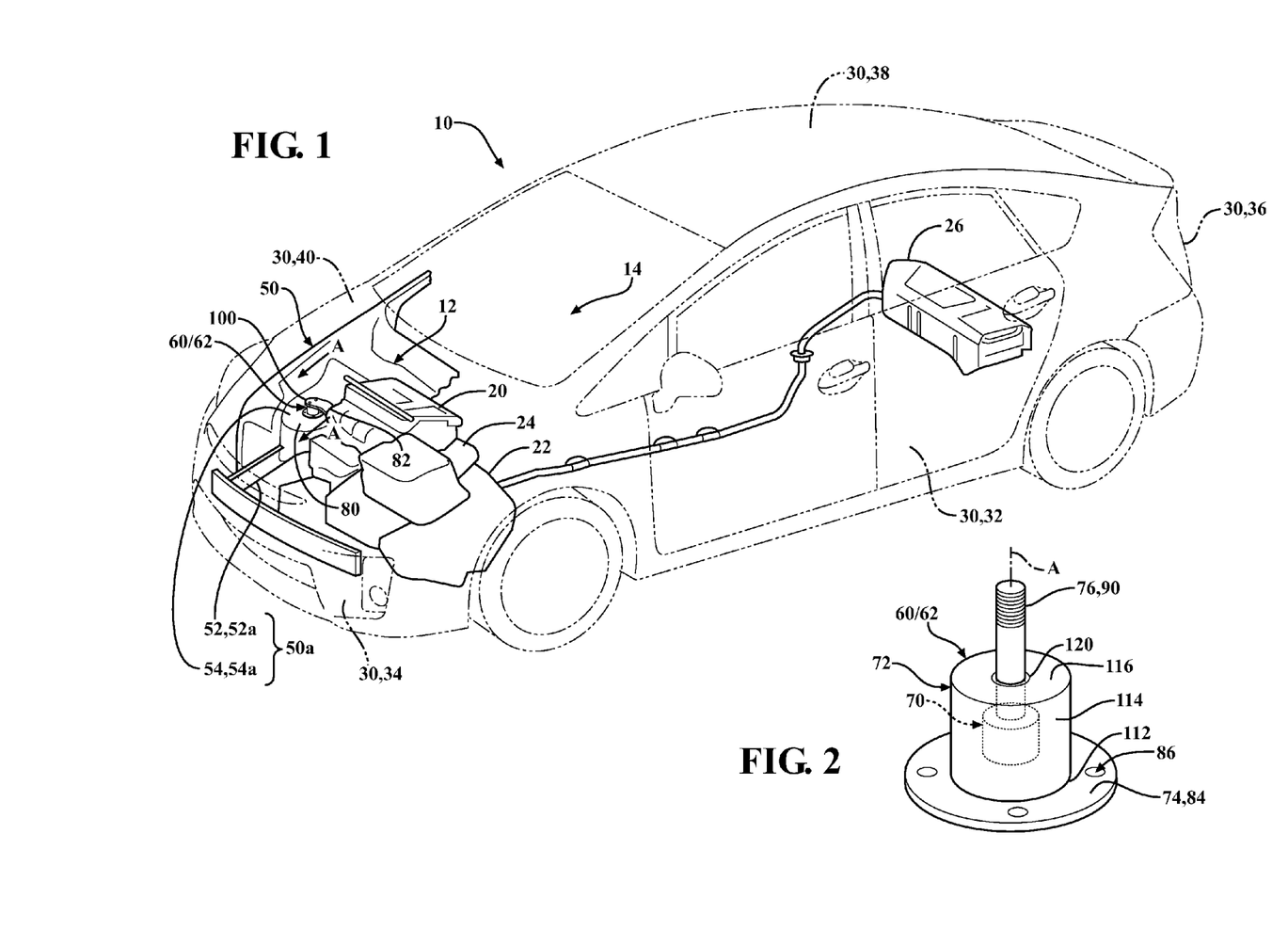
FIG. 1 is a perspective view of a vehicle with an engine compartment housing an engine, showing part of a body structure enclosing the engine compartment and an engine mount connected between the body structure and the engine.
FIG. 2 is a perspective view of the engine mount, showing a housing and an inner moveable core supported for movement relative to the housing.

A representative vehicle 10 is shown in FIG. 1. The vehicle 10 has an exterior and a number of inner compartments, including an engine compartment 12 and a passenger compartment 14. The vehicle 10 includes, among other things, an engine 20, a motor/generator 22, a transmission 24 and other powertrain components housed in its engine compartment 12. Some powertrain components, such as a battery 26, may be housed elsewhere in the vehicle 10.

The vehicle 10 has a body 30. The body 30 forms the exterior of the vehicle 10, and defines its engine compartment 12 and passenger compartment 14. The body 30 has upright sides 32 with doors, a front end 34, a rear end 36, a roof 38 and a hood 40. The body 30 includes a rigid body structure 50. The body structure 50 is constructed from, among other things, interconnected frame members 52 and body panels 54. The body structure 50 encloses the inner compartments of the vehicle 10, including its engine compartment 12 and passenger compartment 14.

The frame members 52 of the body structure 50 include a pair of spaced longitudinally extending front side rails 52a (one shown, with the other being a mirror image), and the body panels 54 of the body structure 50 include a pair of strut towers 54a (one shown, with the other being a mirror image). For the upright sides 32 of the body 30, the front side rails 52a and the strut towers 54a collectively form, in part, the fronts of upright side structures 50a. The insides of the fronts of the upright side structures 50a enclose, in part, the engine compartment 12. Other components of the body structure 50 may form the remainder of the upright side structures 50a, the insides of which enclose, in part, the passenger compartment 14.

The engine 20 is mounted to the body structure 50. The engine 20 as a whole may be subject to movement as a product of its own operation. Regardless of its operational state, the engine 20 may also move as a product of the operation of the vehicle 10. The engine 20 may move while the vehicle 10 accelerates, decelerates, corners or is otherwise maneuvered, for example.

In general, since the engine 20 is mounted to the body structure 50, the body structure 50, and the remainder of the vehicle 10, are susceptible to having the movement of the engine 20 transferred to them. In order to manage the transfer of its movement to the body structure 50, and to the remainder of the vehicle 10, the engine 20 is mounted to the body structure 50 with one or more engine mounts 60/62. Below, one example engine mount 60 is described with reference to FIG. 3, and another example engine mount 62 is described with reference to FIG. 4. These examples are referred to collectively as the engine mount 60/62 in connection with the description of their common components and operation. Otherwise, these examples are referred to individually as the engine mount 60 or the engine mount 62, as the case may be. Although this description follows with reference to the engine 20 and the engine mount 60/62, this disclosure is applicable in principle to similar mounts by which other powertrain components, such as the motor/generator 22 or the transmission 24, are mounted to the body structure 50.

A representative engine mount 60/62 is shown with additional reference to FIG. 2. The engine mount 60/62 has an inner moveable core 70. The remainder of the engine mount 60/62 has, among other things, a housing 72 for the moveable core 70. In general, the housing 72 supports the moveable core 70 for movement relative to the housing 72 and the remainder of the engine mount 60/62.

In the vehicle 10, the engine mount 60/62 is connected between the body structure 50 and the engine 20. One of the housing 72 or the moveable core 70 is connected to the body structure 50, and the other of the housing 72 or the moveable core 70 is connected to the engine 20. The housing 72 may have a housing-side connection portion 74, and the moveable core 70 may have a moveable-core-side connection portion 76 extending from the housing 72. The body structure 50 may have a body-structure-side connection portion 80, and the engine 20 may have an engine-side connection portion 82. Both the body-structure-side connection portion 80 and the engine-side connection portion 82 may be generally open to the engine compartment 12.

If the housing 72 is connected to the body structure 50, the housing-side connection portion 74 and the corresponding body-structure-side connection portion 80 may be collaboratively configured for connection to one another. In this configuration, where the moveable core 70 is further connected to the engine 20, the moveable-core-side connection portion 76 and the corresponding engine-side connection portion 82 may be collaboratively configured for connection to one another. The housing-side connection portion 74 and the corresponding body-structure-side connection portion 80 may be configured for connection to one another either directly or indirectly via brackets or other mounting hardware. Likewise, the moveable-core-side connection portion 76 and the corresponding engine-side connection portion 82 may be configured for connection to one another either directly or indirectly via brackets or other mounting hardware.

On the other hand, if the moveable core 70 is connected to the body structure 50, the moveable-core-side connection portion 76 and the corresponding body-structure-side connection portion 80 may be collaboratively configured for connection to one another. In this configuration, where the housing 72 is further connected to the engine 20, the housing-side connection portion 74 and the corresponding engine-side connection portion 82 may be collaboratively configured for connection to one another. The moveable-core-side connection portion 76 and the corresponding body-structure-side connection portion 80 may be configured for connection to one another either directly or indirectly via brackets or other mounting hardware. Likewise, the housing-side connection portion 74 and the corresponding engine-side connection portion 82 may be configured for connection to one another either directly or indirectly via brackets or other mounting hardware.

In a representative mounting configuration, the housing 72 is connected to the body structure 50, and the moveable core 70 is connected to the engine 20. As shown with additional reference to FIGS. 3 and 4, the housing-side connection portion 74 is a radially extending flange 84 with circumferentially spaced bolt receiving holes 86. The corresponding body-structure-side connection portion 80 is an area of the body structure 50 that is open to the engine compartment 12, and configured to matably engage the flange 84 and retentively receive bolts 88 extending through the bolt receiving holes 86. The corresponding body-structure-side connection portion 80 may be an area of one of the pair of strut towers 54a, for example.

Figure 3:
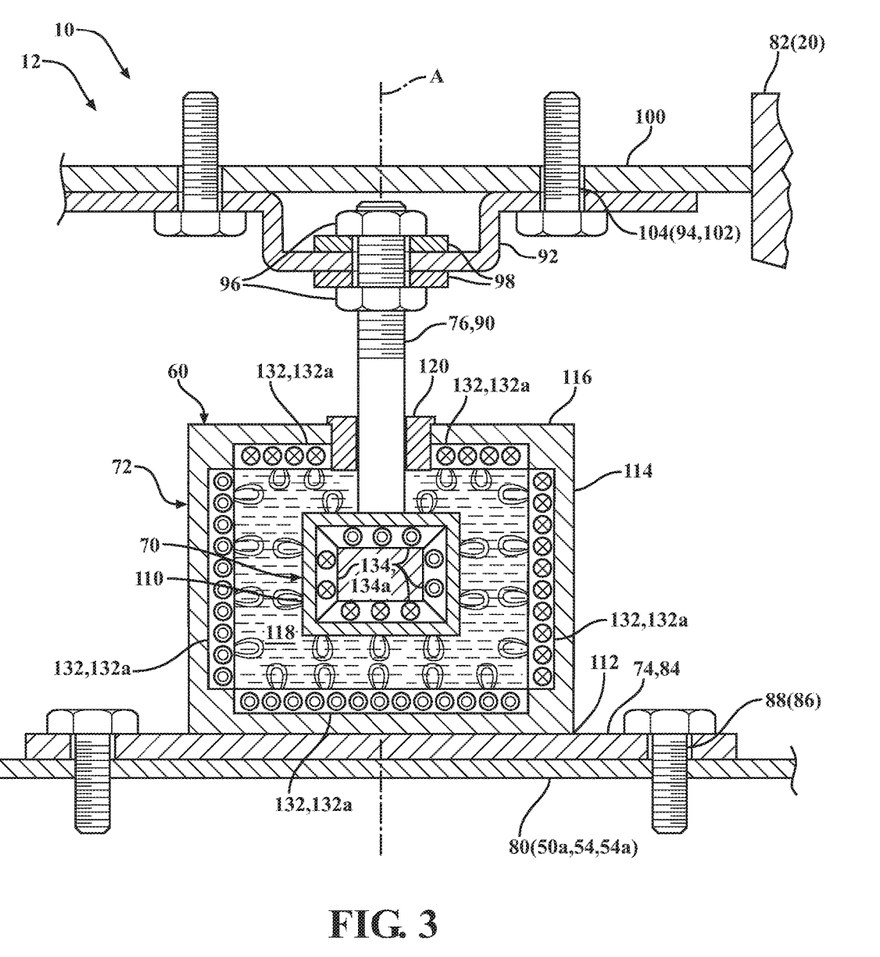
FIG. 3 is a cross section of the vehicle taken along the line A-A in FIG. 1, showing one example of the engine mount with components of a magnetic field generation system for generating magnetic fields between the housing and the moveable core that locate the moveable core relative to the housing to manage the transfer of the engine's movement to the body structure.
Figure 4:
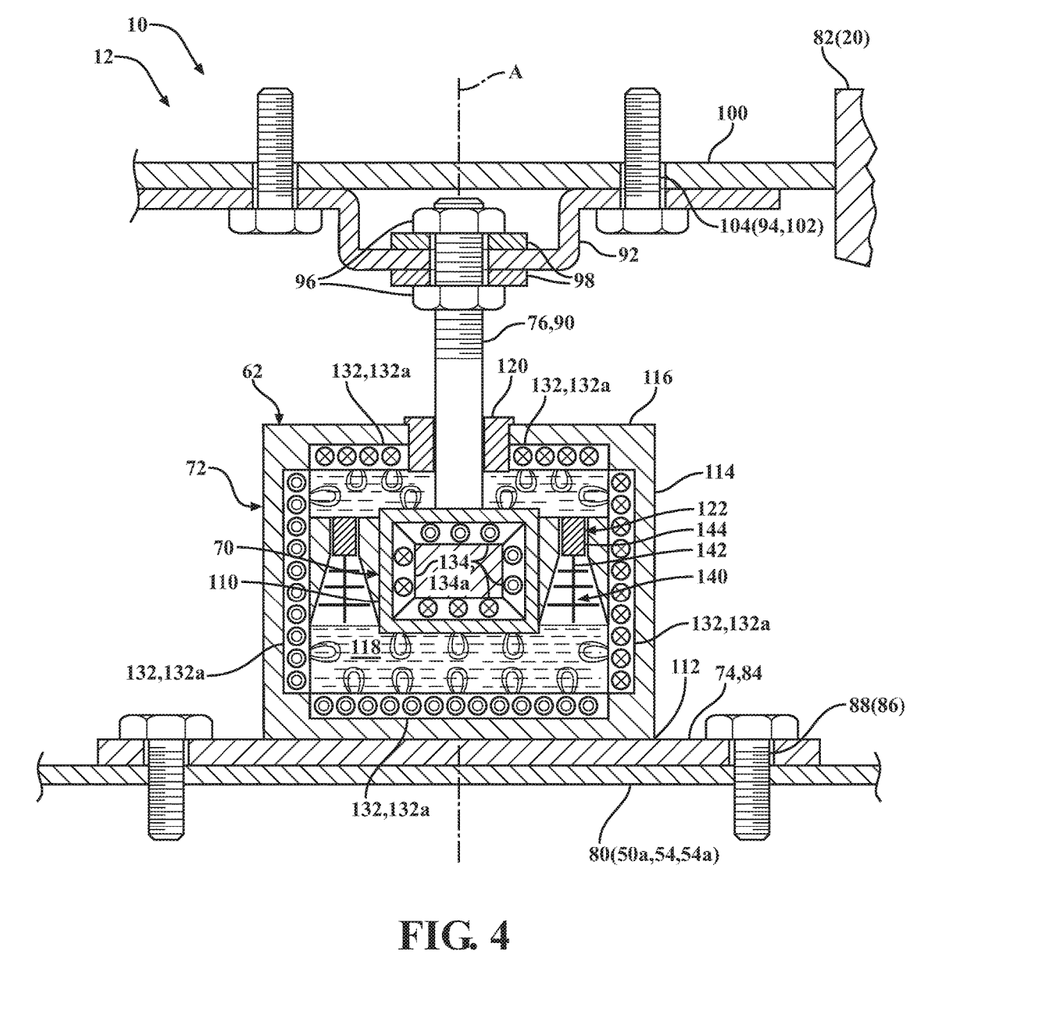
FIG. 4 is a cross section of the vehicle taken along the line A-A in FIG. 1, showing another example of the engine mount with an additional hydraulic regeneration system.

The moveable-core-side connection portion 76 is the terminal part of a stud 90 that extends through the housing 72. The stud 90 supports a bracket 92 with circumferentially spaced bolt receiving holes 94. The bracket 92 is retentively held on the stud 90 by a pair of nuts 96 secured on either side of the bracket 92. A pair of isolators 98 may be positioned on the stud 90 on either side of the bracket 92 and sandwiched between the pair of nuts 96. The isolators 98 may be composed of any suitable material or combination of materials. The material of the isolators 98 may be, or include, rubber, for example. The corresponding engine-side connection portion 82 is an area of the engine 20 that supports another bracket 100 with circumferentially spaced bolt receiving holes 102, and configured to matably engage the bracket 92 and retentively receive bolts 104 extending through its bolt receiving holes 102 and the bolt receiving holes 94 of the bracket 92.

By its connection between the body structure 50 and the engine 20, the engine mount 60/62 supports the engine 20 with respect to the body structure 50. The engine mount 60/62 may support the engine 20 as a whole with respect to the body structure 50, or may support part of the engine 20 with respect to the body structure 50. If the engine mount 60/62 supports part of the engine 20 with respect to the body structure 50, similar engine mounts 60/62 may be connected between the body structure 50 and the engine 20 to support the remainder of the engine 20. Alternatively, or additionally, to support the remainder of the engine 20, other kinds of engine mounts may be connected between the body structure 50 and the engine 20, or the engine 20 may be connected to the body structure 50 without an engine mount.

In the engine mount 60/62, the housing 72, either alone or in combination with the remainder of the engine mount 60/62, supports the moveable core 70 for movement relative to the housing 72. The housing 72 may mechanically constrain the movement of the moveable core 70 relative to the housing 72 in one or more restricted degrees of freedom. The housing 72 is accordingly not permissive of the movement of the moveable core 70 in the restricted degrees of freedom. Moreover, the moveable core 70 is rigidly mechanically coupled to the housing 72 in the restricted degrees of freedom.

The housing 72 may otherwise support the moveable core 70 for movement relative to the housing 72 in one or more remaining open free degrees of freedom. The housing 72 is accordingly permissive of the movement of the moveable core 70 in the open degrees of freedom. The housing 72 may permit the movement of the moveable core 70 in the open degrees of freedom to one or more floating poses. In each of the floating poses, the moveable core 70 is rigidly mechanically decoupled from the housing 72 in the open degrees of freedom. Collectively, the one or more floating poses define a range of movement of the moveable core 70 relative to the housing 72.

The housing 72 may nonetheless limit the amount of movement of the moveable core 70 in one, some or all of the open degrees of freedom. The housing 72 may permit the movement of the moveable core 70 in the open degrees of freedom only to one or more resting poses where the moveable core 70 rests directly or indirectly against the housing 72. In each of the one or more resting poses, the moveable core 70 is rigidly mechanically coupled to the housing 72 in one, some or all of the open degrees of freedom, which will include in any case those in which the moveable core 70 is moveable to a given resting pose. The moveable core 70 may include an exterior isolator 110 at any of its portions subject to resting against the housing 72. The isolator 110 may be composed of any suitable material or combination of materials. The material of the isolator 110 may be, or include, rubber, for example. Collectively, the one or more resting poses bound the range of movement of the moveable core 70 relative to the housing 72.

In general, the range of movement of the moveable core 70 relative to the housing 72 is the combined product of the housing 72, the moveable core 70 and how the housing 72 supports the moveable core 70. As shown, in the engine mount 60/62, the housing 72 is tubular, and the moveable core 70 is sized and shaped for movement inside the housing 72. The housing 72 is closed ended and extends along a longitudinal axis A, with a closed base 112 at one end from which the flange 84 radially extends, sidewalls 114, and a cap 116 through which the stud 90 extends at the other end. The base 112, sidewalls 114 and cap 116 may define a fluid tight internal reservoir 118 in the inside of the housing 72, and the housing 72 may hold a damping fluid in its reservoir 118 around the moveable core 70.

The moveable-core-side connection portion 76 of the moveable core 70 extends through the housing 72, along its longitudinal axis A, at the cap 116. The housing 72 supports the moveable core 70 for movement relative to the housing 72 at the point through which its moveable-core-side connection portion 76 extends through the cap 116. More specifically, the housing 72 has a support 120 at the cap 116 through which the moveable-core-side connection portion 76 extends, and the support 120 supports the moveable core 70 for movement relative to the housing 72, in whole or in part. The support 120 may be or include a bushing or a bearing, for example.

In the example engine mount 60 shown in FIG. 3, the support 120 supports the moveable core 70 for movement relative to the housing 72 substantially by itself. With this configuration, the one or more restricted degrees of freedom and the one or more remaining open free degrees of freedom may have a common reference frame on the moveable core 70 at the support 120.

The one or more restricted degrees of freedom, in which the housing 72, by its support 120, mechanically constrains the movement of the moveable core 70 relative to the housing 72, may include the two translational degrees of freedom across the longitudinal axis A of the housing 72, for example.

The one or more open degrees of freedom, in which the housing 72, by its support 120, permits the movement of the moveable core 70 relative to the housing 72, may include the other translational degree of freedom along the longitudinal axis A of the housing 72, for example. The housing 72 accordingly permits the translation of the moveable core 70 to one or more floating poses along this translational degree of freedom. The housing 72 may permit this translation only to a resting pose where the moveable core 70 rests, for example, against its base 112. Additionally, or alternatively, the housing 72 may permit this translation only to a resting pose where the moveable core 70 rests, for example, against its cap 116.

The one or more open degrees of freedom may further include one, some or all of the three rotational degrees of freedom about the support 120. For each of these three rotational degrees of freedom, if it is an open degree of freedom, the housing 72 accordingly permits the rotation of the moveable core 70 to one or more floating poses about that rotational degree of freedom. The housing 72 may permit this rotation only to resting poses where the moveable core 70 rests, for example, against the sidewalls 114 of the housing 72.

In the example engine mount 62 shown in FIG. 4, the engine mount 62 additionally includes an optional hydraulic regeneration system 122. With the hydraulic regeneration system 122, among other things, the moveable core 70 seals against the sidewalls 114 of the housing 72 for sliding contact. Accordingly, both the support 120 and the sidewalls 114 support the moveable core 70 for movement relative to the housing 72. With this configuration, the one or more restricted degrees of freedom and the one or more remaining open free degrees of freedom may have a common reference frame on the moveable core 70 between the support 120 and the sidewalls 114.

The one or more restricted degrees of freedom, in which the housing 72, by its support 120 and sidewalls 114, mechanically constrains the movement of the moveable core 70 relative to the housing 72, may include the two translational degrees of freedom across the longitudinal axis A of the housing 72, for example. In accordance with the moveable core 70 sealing against the sidewalls 114 of the housing 72 for sliding contact, the one or more restricted degrees of freedom may further include all three of the rotational degrees of freedom.

The one or more open degrees of freedom, in which the housing 72, by its support 120 and sidewalls 114, permits the movement of the moveable core 70 relative to the housing 72, may include the other translational degree of freedom along the longitudinal axis A of the housing 72, for example. The housing 72 accordingly permits the translation of the moveable core 70 to one or more floating poses along this translational degree of freedom. The housing 72 may permit this translation only to a resting pose where the moveable core 70 rests, for example, against its base 112. Additionally, or alternatively, the housing 72 may permit this translation only to a resting pose where the moveable core 70 rests, for example, against its cap 116.

In the vehicle 10, with the engine mount 60/62 supporting the engine 20 with respect to the body structure 50, the movement of the engine 20 is imparted to the engine mount 60/62 instead of to the body structure 50. More specifically, the movement of the engine 20 is imparted either to the moveable core 70, if the moveable core 70 is connected to the engine 20 and the housing 72 is connected to the body structure 50, or to the housing 72, if the housing 72 is connected to the engine 20 and the moveable core 70 is connected to the body structure 50. In either case, the engine mount 60/62 may manage the transfer of the movement of the engine 20 to the body structure 50, and to the remainder of the vehicle 10.

In general, the engine mount 60/62 may not substantially manage the transfer of the movement of the engine 20 to the body structure 50, and to the remainder of the vehicle 10, in the restricted degrees of freedom, if any, in which the moveable core 70 is rigidly mechanically coupled to the housing 72.

The engine mount 60/62 may however manage the transfer of the movement of the engine 20 to the body structure 50, and to the remainder of the vehicle 10, in the open degrees of freedom. As shown with additional reference to FIG. 5, the vehicle 10 may include a magnetic field generation system 130. The magnetic field generation system 130 generates magnetic fields between the housing 72 and the moveable core 70 that locate the moveable core 70 relative to the housing 72 to manage the transfer of the movement of the engine 20 to the body structure 50, and to the remainder of the vehicle 10, in the open degrees of freedom.

Figure 5:
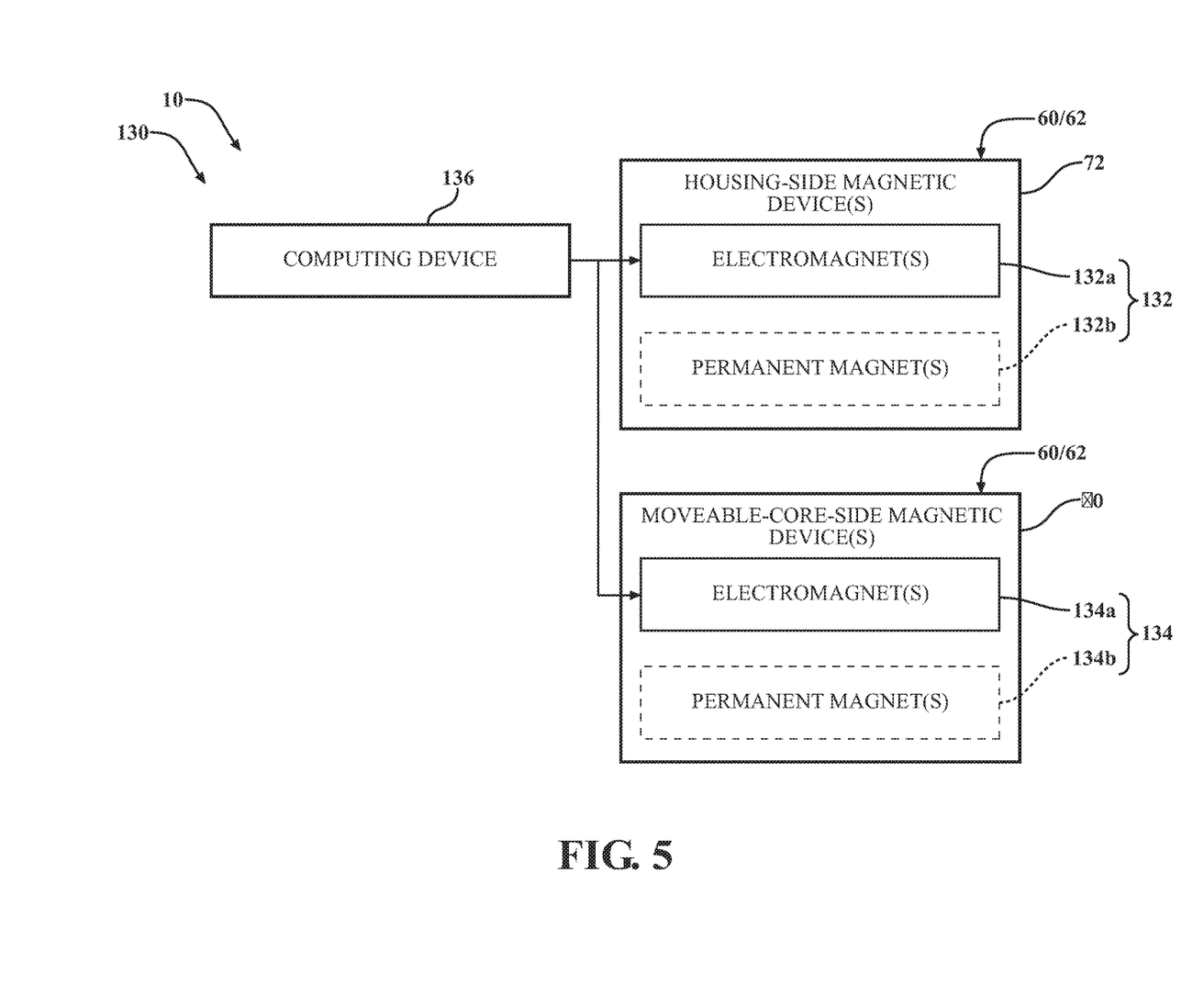
FIG. 5 is a schematic view of the magnetic field generation system.

The magnetic field generation system 130 includes one or more housing-side magnetic devices 132 at the housing 72, and one or more moveable-core-side magnetic devices 134 at the moveable core 70. Collectively, the housing-side magnetic devices 132 and the moveable-core-side magnetic devices 134 generate magnetic fields between the housing 72 and the moveable core 70. The magnetic fields may include one or more housing-side magnetic fields generated by the housing-side magnetic devices 132, and one or more moveable-core-side magnetic fields generated by the moveable-core-side magnetic devices 134.

Any given housing-side magnetic device 132 may, as shown, be a housing-side electromagnet 132a that is selectively actuable to generate its one or more housing-side magnetic fields. Optionally, all of the housing-side magnetic devices 132 may be housing-side electromagnets 132a that are each selectively actuable to generate its one or more housing-side magnetic fields. Any housing-side electromagnets 132a may be powered by the battery 26 or a separate power source dedicated to the magnetic field generation system 130. Alternatively, any given housing-side magnetic device 132 could be a housing-side permanent magnet 132b that permanently generates its one or more housing-side magnetic fields.

Any given moveable-core-side magnetic device 134 may, as shown, be a moveable-core-side electromagnet 134a that is selectively actuable to generate its one or more moveable-core-side magnetic fields. Optionally, all of the moveable-core-side magnetic devices 134 may be moveable-core-side electromagnets 134a that are each selectively actuable to generate its one or more moveable-core-side magnetic fields. Any moveable-core-side electromagnets 134a may be powered by the battery 26 or a separate power source dedicated to the magnetic field generation system 130. Alternatively, any given moveable-core-side magnetic device 134 could be a moveable-core-side permanent magnet 134b that permanently generates its one or more moveable-core-side magnetic fields.

In one example of the magnetic field generation system 130, either one or more of the housing-side magnetic devices 132 are housing-side electromagnets 132a, or one or more of the moveable-core-side magnetic devices 134 are moveable-core-side electromagnets 134a, or both. Accordingly, the magnetic field generation system 130 may selectively activate the engine mount 60/62 by selectively generating at least some of the magnetic fields between the housing 72 and the moveable core 70 by the selective actuation of any housing-side electromagnets 132a and any moveable-core-side electromagnets 134a. If all of the one or more of the housing-side magnetic devices 132 are housing-side electromagnets 132a, and all of the one or more of the moveable-core-side magnetic devices 134 are moveable-core-side electromagnets 134a, the magnetic field generation system 130 may selectively activate the engine mount 60/62 by selectively generating all of the magnetic fields by the selective actuation of the housing-side electromagnets 132a and the moveable-core-side electromagnets 134a.

To support its selective activation of the engine mount 60/62 in configurations with either housing-side electromagnets 132a or moveable-core-side electromagnets 134a, or both, the magnetic field generation system 130 may include a computing device 136 for controlling their actuation.

Any housing-side electromagnets 132a and any moveable-core-side electromagnets 134a may be communicatively connected to the computing device 136 through one or more wired or wireless communication links. The computing device 136 may be included in the vehicle 10. Although the computing device 136 may be dedicated to the magnetic field generation system 130, it is contemplated that computing device 136 may also support the operation of other systems of the vehicle 10, for instance, as a part of a central control system for the vehicle 10.

The computing device 136 includes a processor communicatively coupled with a memory. The processor may include any device capable of executing machine-readable instructions, which may be stored on a non-transitory computer-readable medium, for example the memory. The processor may include a controller, an integrated circuit, a microchip, a computer, and/or any other computing device. The various algorithms and data for the systems that support the operation the magnetic field generation system 130 reside in whole or in part in the memory. The memory may include any type of computer readable medium suitable for storing data and algorithms. For example, the memory may include RAM, ROM, a flash memory, a hard drive, and/or any device capable of storing machine-readable instructions.

The computing device 136 may also include an input/output interface for facilitating communication between the processor and any housing-side electromagnets 132a, any moveable-core-side electromagnets 134a and other components. Although the computing device 136 is shown for simplicity as being a single unit, in practice the computing device 136 may be a plurality of units, each having one or more memories and/or processors that may be communicatively coupled with one or more components.

The computing device 136 may, for instance, have a module residing in memory for operating the magnetic field generation system 130 to selectively activate the engine mount 60/62 to attenuate the transfer of the movement of the engine 20 to the body structure 50 in the open degrees of freedom.

In general, the engine mount 60/62 will attenuate the transfer of the movement of the engine 20 to the body structure 50 when the moveable core 70 is retentively rigidly mechanically decoupled from the housing 72 in the open degrees of freedom. In its open degrees of freedom, the moveable core 70 is supported for movement relative to the housing 72, within its range of movement, to one or more floating poses. In each of the floating poses, the moveable core 70 is rigidly mechanically decoupled from the housing 72 in the open degrees of freedom.

In order to attenuate the transfer of the movement of the engine 20 to the body structure 50, the magnetic field generation system 130 may sustainably generate mutually balanced magnetic fields between the housing 72 and the moveable core 70 in all of the open degrees of freedom that retentively locate the moveable core 70 in one or more floating poses. The mutually balanced magnetic fields may retentively locate the moveable core 70 in one floating pose in its range of movement, or in multiple floating poses within its range of movement. The mutually balanced magnetic fields may but need not be strictly mutually equal magnetic fields. Instead, the mutually balanced magnetic fields may be a factor of identified static and dynamic forces between the housing 72 and the moveable core 70 resulting from the mass and movement of the engine 20 being imparted to the engine mount 60/62. The mutually balanced magnetic fields may be either mutually balanced attractive magnetic fields or mutually balanced repulsive magnetic fields, or any combination of mutually balanced attractive magnetic fields and mutually balanced repulsive magnetic fields.

By retentively locating the moveable core 70 in one or more floating poses, the mutually balanced magnetic fields rigidly mechanically decouple the moveable core 70 from the housing 72 in the open degrees of freedom. With the moveable core 70 rigidly mechanically decoupled from the housing 72 in the open degrees of freedom, the transfer of the movement of the engine 20 to the body structure 50 is attenuated in the open degrees of freedom.

Accordingly, the magnetic field generation system 130 may selectively activate the engine mount 60/62 to attenuate the transfer of the movement of the engine 20 to the body structure 50 by selectively generating at least some of the mutually balanced magnetic fields between the housing 72 and the moveable core 70 by the selective actuation of any housing-side electromagnets 132a and any moveable-core-side electromagnets 134a.

Any given housing-side magnetic device 132 may generate one or more housing-side magnetic fields that are mutually balanced in one, some or all of the open degrees of freedom to corresponding moveable-core-side magnetic fields generated by one or more moveable-core-side magnetic devices 134. Optionally, any given housing-side magnetic device 132 may be dedicated to the generation of one or more housing-side magnetic fields that are mutually balanced in one open degree of freedom to corresponding moveable-core-side magnetic fields generated by one or more moveable-core-side magnetic devices 134.

Similarly, any given moveable-core-side magnetic device 134 may generate one or more moveable-core-side magnetic fields that are mutually balanced in, one, some or all of the open degrees of freedom to corresponding housing-side magnetic fields generated by one or more housing-side magnetic devices 132. Optionally, any given moveable-core-side magnetic device 134 may be dedicated to the generation of one or more moveable-core-side magnetic fields that are mutually balanced in one open degree of freedom to corresponding housing-side magnetic fields generated by one or more housing-side magnetic devices 132.

The computing device 136 may, for instance, have a module residing in memory for operating the magnetic field generation system 130 to selectively activate the engine mount 60/62 to promote the transfer of the movement of the engine 20 to the body structure 50 in the open degrees of freedom.

In general, the engine mount 60/62 will promote the transfer of the movement of the engine 20 to the body structure 50 when the moveable core 70 is retentively rigidly mechanically coupled to the housing 72 in the open degrees of freedom. In its open degrees of freedom, the moveable core 70 is supported for movement relative to the housing 72, within its range of movement, to one or more floating poses. However, one or more resting poses, where the moveable core 70 rests directly or indirectly against the housing 72, bound the range of movement. In each of the one or more resting poses, the moveable core 70 is rigidly mechanically coupled to the housing 72.

In order to promote the transfer of the movement of the engine 20 to the body structure 50, the magnetic field generation system 130 may sustainably generate mutually unbalanced magnetic fields between the housing 72 and the moveable core 70 in one, some or all of the open degrees of freedom that retentively locate the moveable core 70 in one or more resting poses. The mutually unbalanced magnetic fields may retentively locate the moveable core 70 in one resting pose, or in multiple resting poses. The resting pose may be one where the moveable core 70 rests against the base 112 of the housing 72, or one where the moveable core 70 rests against the cap 116 of the housing 72, for example. The mutually unbalanced magnetic fields may but need not be strictly mutually unequal magnetic fields. Instead, the mutually unbalanced magnetic fields may be a factor of identified static and dynamic forces between the housing 72 and the moveable core 70 resulting from the mass and movement of the engine 20 being imparted to the engine mount 60/62. The mutually unbalanced magnetic fields may be either mutually unbalanced attractive magnetic fields or mutually unbalanced repulsive magnetic fields, or any combination of mutually unbalanced attractive magnetic fields and mutually unbalanced repulsive magnetic fields.

By retentively locating the moveable core 70 in one or more resting poses, the mutually unbalanced magnetic fields rigidly mechanically couple the moveable core 70 to the housing 72 in at least one of the open degrees of freedom. With the moveable core 70 rigidly mechanically coupled to the housing 72, the transfer of the movement of the engine 20 to the body structure 50 is promoted.

Accordingly, the magnetic field generation system 130 may selectively activate the engine mount 60/62 to promote the transfer of the movement of the engine 20 to the body structure 50 by selectively generating at least some of the mutually unbalanced magnetic fields between the housing 72 and the moveable core 70 by the selective actuation of any housing-side electromagnets 132*a* and any moveable-core-side electromagnets 134*a*.

Any given housing-side magnetic device 132 may generate one or more housing-side magnetic fields that are mutually unbalanced in one, some or all of the open degrees of freedom to corresponding moveable-core-side magnetic fields generated by one or more moveable-core-side magnetic devices 134. Optionally, any given housing-side magnetic device 132 may be dedicated to the generation of one or more housing-side magnetic fields that are mutually unbalanced in one open degree of freedom to corresponding moveable-core-side magnetic fields generated by one or more moveable-core-side magnetic devices 134.

Similarly, any given moveable-core-side magnetic device 134 may generate one or more moveable-core-side magnetic fields that are mutually unbalanced in, one, some or all of the open degrees of freedom to corresponding housing-side magnetic fields generated by one or more housing-side magnetic devices 132. Optionally, any given moveable-core-side magnetic device 134 may be dedicated to the generation of one or more moveable-core-side magnetic fields that are mutually unbalanced in one open degree of freedom to corresponding housing-side magnetic fields generated by one or more housing-side magnetic devices 132.

In general, the magnetic field generation system 130 may selectively activate the engine mount 60/62 to attenuate or promote the transfer of the movement of the engine 20 to the body structure 50 in the open degrees of freedom any time the vehicle 10 is operational. As shown with additional reference to FIG. 6, the engine mount 60/62 may be selectively activated based on the current and anticipated operational states of the engine 20, for example. The operational states of the engine 20 may include an engine START state, and engine RUNNING state and an engine OFF state. These and other operational states of the engine 20 may be based on, among other things, an accelerator pedal input, overall powertrain or engine 20 torque requirements, battery 26 requirements or temperature requirements, or any combination of these.

Figure 6:
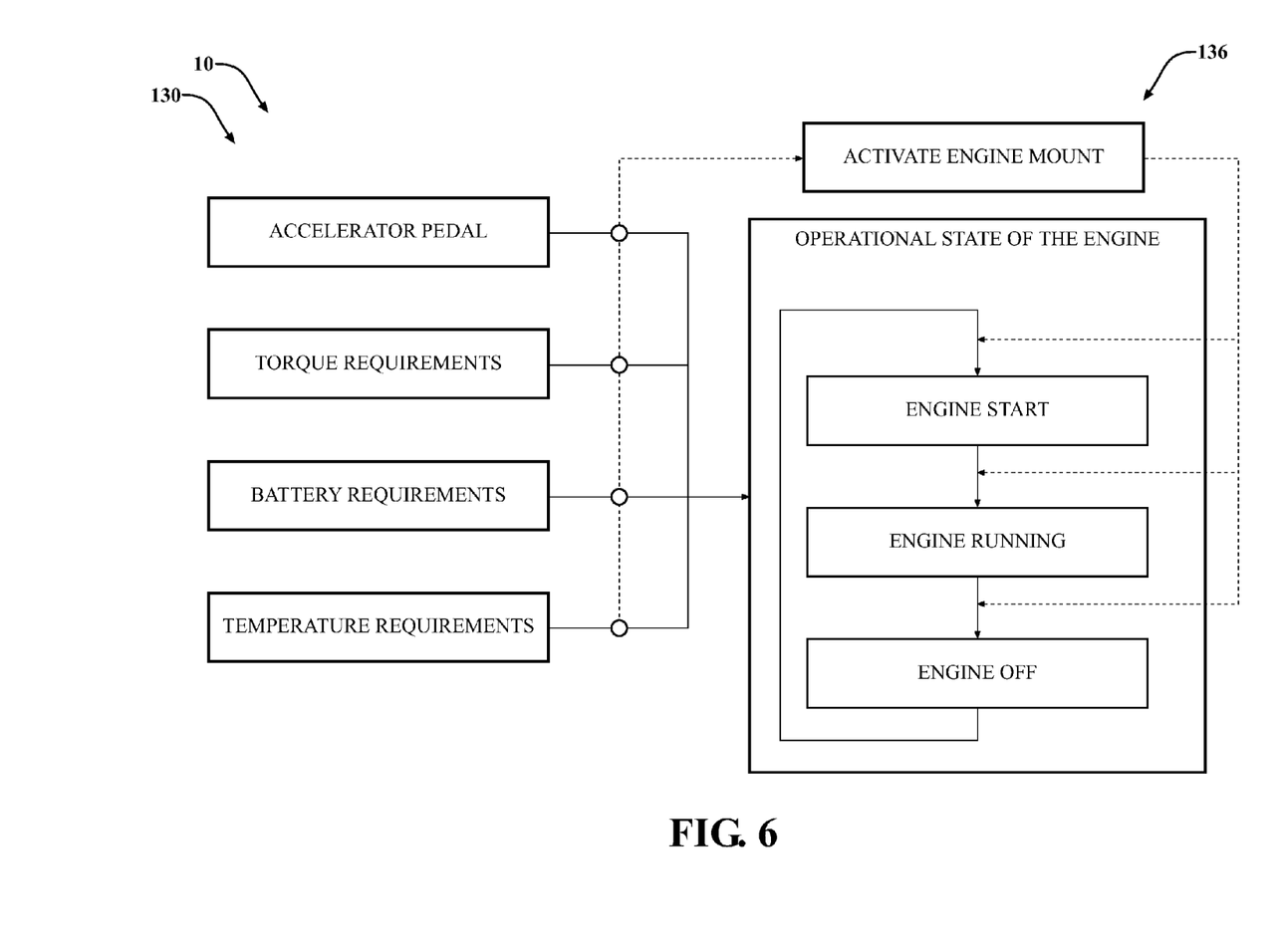
FIG. 6 is a state diagram for the vehicle, showing the magnetic field generation system's selective activation of the engine mount based on the engine's current and anticipated operational states.

The movement of the engine 20 may be pronounced, for example, when it operates in the engine START state or the engine RUNNING state, or as it switches from the engine RUNNING state to the engine OFF state. The engine mount 60/62 may be selectively activated to attenuate the transfer of the movement of the engine 20 to the body structure 50 in the open degrees of freedom either prior or during, or both, one, some or all of these cases. In any of these cases, if any housing-side electromagnets 132*a* or moveable-core-side electromagnets 134*a* are powered by the battery 26, consideration may be given to battery 26 requirements in addition to the current and anticipated operational states of the engine 20.

The engine 20 may also move while the vehicle 10 accelerates, decelerates, corners or is otherwise maneuvered. The engine mount 60/62 may be selectively activated to promote the transfer of the movement of the engine 20 to the body structure 50 in the open degrees of freedom either prior or during, or both, one, some or all of these maneuvers in order to improve the dynamic handling or other driving qualities of the vehicle 10 by reducing or eliminating relative movement between the engine 20 and the body structure 50. In any of these maneuvers, if any housing-side electromagnets 132*a* or moveable-core-side electromagnets 134*a* are powered by the battery 26, consideration may additionally be given to battery 26 requirements.

In the absence of its activation by the magnetic field generation system 130, the engine mount 60/62 may still manage the transfer of the movement of the engine 20 to the body structure 50 in the open degrees of freedom. The engine mount 60/62 may, for instance, attenuate the transfer of the movement of the engine 20 to the body structure 50 by viscously damping the movement of the moveable core 70 in the open degrees of freedom, within its range of movement, with the damping fluid held around the moveable core 70 in the reservoir 118 of the housing 72.

Optionally, the damping fluid may be a magnetorheological (MR) damping fluid. In this case, the viscosity of the MR damping fluid may be subject to selective control by subjugation to magnetic fields. In order to manage the transfer of the movement of the engine 20 to the body structure 50, the magnetic field generation system 130 may selectively generate subjugating magnetic fields through the MR damping fluid that decrease its viscosity to attenuate the transfer of the movement of the engine 20 to the body structure 50 in the open degrees of freedom, or increase its viscosity to promote the transfer of the movement of the engine 20 to the body structure 50 in the open degrees of freedom.

In cases where the magnetic field generation system 130 generates mutually balanced magnetic fields between the housing 72 and the moveable core 70 that retentively locate the moveable core 70 in multiple floating poses within its range of movement, or in the absence of the activation of the engine mount 60/62 by the magnetic field generation system 130, the moveable core 70 may move in the open degrees of freedom, within its range of movement.

This movement of the moveable core 70 displaces the damping fluid held around the moveable core 70 in the reservoir 118 of the housing 72. In the example engine mount 62 shown in FIG. 4, the engine mount 62 additionally includes the optional hydraulic regeneration system 122 for converting this displacement of the damping fluid into electrical energy.

With the hydraulic regeneration system 122, the moveable core 70 seals against the sidewalls 114 of the housing 72 for sliding contact. One or more fluid channels 140 open to the reservoir 118 on either side of the moveable core 70. The one or more fluid channels 140 may be defined by either the sidewalls 114 of the housing 72, as shown, or by the moveable core 70, or both. With its displacement, the damping fluid held around the moveable core 70 in the reservoir 118 flows through the fluid channels 140. The hydraulic regeneration system 122 includes a turbine rotor 142 in each fluid channel 140 that rotates in response to the flowing damping fluid, and an electric motor 144 to which the rotational motion of the turbine rotor 142 is applied in order to drive the electric motor 144 and, therefore, cause the electric motor 144 to generate electrical energy. The generated electrical energy may be used to directly or indirectly power either any housing-side electromagnets 132*a* or moveable-core-side electromagnets 134*a*, or other electrical devices in the vehicle 10, or both.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A system for managing the transfer of the movement of a vehicle's powertrain component to the vehicle's body structure, comprising:
    a powertrain mount connectable between a vehicle's powertrain component and body structure, the powertrain mount including a moveable core and a housing for the moveable core, the housing supporting the moveable core for movement relative to the housing, in one or more open degrees of freedom, to one or more floating poses where the moveable core is rigidly mechanically decoupled from the housing in each of the open degrees of freedom; and
    a magnetic field generation system, the magnetic field generation system including one or more housing-side magnetic devices at the housing and one or more moveable-core-side-magnetic devices at the moveable core, the housing-side magnetic devices and the moveable-core-side magnetic devices configured to collectively generate mutually balanced magnetic fields between the housing and the moveable core that attract and/or repel each other in sustained mutual balance in each of the open degrees of freedom to thereby retentively locate the moveable core in at least one of the floating poses.

2. The system of claim 1, wherein one or more of the housing-side magnetic devices and the moveable-core-side magnetic devices are electromagnets, the magnetic field generation system further including:
    a computing device in communication with the electromagnets, the computing device configured to control the actuation of the electromagnets to generate, at least in part, the mutually balanced magnetic fields.

3. The system of claim 1, wherein:
    the housing supports the moveable core for movement relative to the housing, in the open degrees of freedom, to one or more resting poses where the moveable core is rigidly mechanically coupled to the housing in at least one of the open degrees of freedom, and
    the housing-side magnetic devices and the moveable-core-side magnetic devices are configured to collectively generate mutually unbalanced magnetic fields between the housing and the moveable core that attract and/or repel each other in sustained mutual unbalance in the at least one of the open degrees of freedom to thereby retentively locate the moveable core in at least one of the resting poses.

4. The system of claim 3, wherein one or more of the housing-side magnetic devices and the moveable-core-side magnetic devices are electromagnets, the magnetic field generation system further including:
    a computing device in communication with the electromagnets, the computing device configured to control the actuation of the electromagnets to generate, at least in part, the mutually unbalanced magnetic fields.

5. The system of claim 1, wherein the open degrees of freedom include a translational degree of freedom along a longitudinal axis of the housing.

6. The system of claim 1, wherein the open degrees of freedom include one or more rotational degrees of freedom about a point at which the moveable core is supported by the housing.

7. The system of claim 1, wherein the open degrees of freedom have a common reference frame at a point at which the moveable core is supported by the housing, and the open degrees of freedom include a translational degree of freedom along a longitudinal axis of the housing that includes the point, and one or more rotational degrees of freedom about the point.

8. The system of claim 1, wherein the housing defines a reservoir and holds a damping fluid in the reservoir around the moveable core, the damping fluid viscously damping the movement of the moveable core in the open degrees of freedom.

9. The system of claim 1, wherein the housing defines a reservoir and holds a damping fluid in the reservoir around the moveable core, the moveable core displacing the damping fluid when the moveable core moves in the open degrees of freedom, further comprising:
    a hydraulic regeneration system configured to convert the damping fluid's displacement into electrical energy.

10. A vehicle, comprising:
    a body structure, the body structure enclosing an engine compartment;
    a powertrain component housed in the engine compartment;
    a powertrain mount supporting the powertrain component with respect to the body structure, the powertrain mount including:
        a moveable core, the moveable core having a moveable-core-side connection portion connected to one of the body structure or the powertrain component, and
        a housing for the moveable core, the housing having a housing-side connection portion connected to the other of the body structure or the powertrain component, and supporting the moveable core for movement relative to the housing, in one or more open degrees of freedom, to one or more floating poses where the moveable core is rigidly mechanically decoupled from the housing in each of the open degrees of freedom; and
    a magnetic field generation system, the magnetic field generation system including one or more housing-side magnetic devices at the housing and one or more moveable-core-side magnetic devices at the moveable core, the housing-side magnetic devices and the moveable-core-side magnetic devices configured to collectively generate mutually balanced magnetic fields between the housing and the moveable core that attract and/or repel each other in sustained mutual balance in each of the open degrees of freedom to thereby retentively locate the moveable core in at least one of the floating poses.

11. The vehicle of claim 10, wherein one or more of the housing-side magnetic devices and the moveable-core-side magnetic devices are electromagnets, the magnetic field generation system further including:
a computing device in communication with the electromagnets, the computing device configured to control the actuation of the electromagnets to generate, at least in part, the mutually balanced magnetic fields.

12. The vehicle of claim 10, wherein:
the housing supports the moveable core for movement relative to the housing, in the open degrees of freedom, to one or more resting poses where the moveable core is rigidly mechanically coupled to the housing in at least one of the open degrees of freedom, and
the housing-side magnetic devices and the moveable-core-side magnetic devices are configured to collectively generate mutually unbalanced magnetic fields between the housing and the moveable core that attract and/or repel each other in sustained mutual unbalance in the at least one of the open degrees of freedom to thereby retentively locate the moveable core in at least one of the resting poses.

13. The vehicle of claim 12, wherein one or more of the housing-side magnetic devices and the moveable-core-side magnetic devices are electromagnets, the magnetic field generation system further including:
a computing device in communication with the electromagnets, the computing device configured to control the actuation of the electromagnets to generate, at least in part, the mutually unbalanced magnetic fields.

14. The vehicle of claim 10, wherein the open degrees of freedom include a translational degree of freedom along a longitudinal axis of the housing.

15. The vehicle of claim 10, wherein the open degrees of freedom include one or more rotational degrees of freedom about a point at which the moveable core is supported by the housing.

16. The vehicle of claim 10, wherein the open degrees of freedom have a common reference frame at a point at which the moveable core is supported by the housing, and the open degrees of freedom include a translational degree of freedom along a longitudinal axis of the housing that includes the point, and one or more rotational degrees of freedom about the point.

17. The vehicle of claim 10, wherein the housing defines a reservoir and holds a damping fluid in the reservoir around the moveable core, the damping fluid viscously damping the movement of the moveable core in the open degrees of freedom.

18. The vehicle of claim 10, wherein the housing defines a reservoir and holds a damping fluid in the reservoir around the moveable core, the moveable core displacing the damping fluid when the moveable core moves in the open degrees of freedom, further comprising:
a hydraulic regeneration system configured to convert the damping fluid's displacement into electrical energy.

19. A system for managing the transfer of the movement of a vehicle's powertrain component to the vehicle's body structure, comprising:
a powertrain mount, the powertrain mount including:
a moveable core, the moveable core having a moveable-core-side connection portion configured for connection to one of a vehicle's body structure or powertrain component, and
a housing for the moveable core, the housing having a housing-side connection portion configured for connection to the other of the vehicle's body structure or powertrain component, and supporting the moveable core for movement relative to the housing, in one or more open degrees of freedom, to one or more floating poses where the moveable core is rigidly mechanically decoupled from the housing in each of the open degrees of freedom; and
a magnetic field generation system, the magnetic field generation system including:
one or more housing-side electromagnets at the housing,
one or more moveable-core-side electromagnets at the moveable core, and
a computing device in communication with the housing-side electromagnets and the moveable-core-side electromagnets, the computing device configured to control the actuation of the housing-side electromagnets and the moveable-core-side electromagnets to generate, at least in part, mutually balanced magnetic fields between the housing and the moveable core that attract and/or repel each other in sustained mutual balance in each of the open degrees of freedom to thereby retentively locate the moveable core in at least one of the floating poses.

20. The system of claim 19, wherein:
the housing supports the moveable core for movement relative to the housing, in the open degrees of freedom, to one or more resting poses where the moveable core is rigidly mechanically coupled to the housing in at least one of the open degrees of freedom, and
the computing device is configured to control the actuation of the housing-side electromagnets and the moveable-core-side electromagnets to generate, at least in part, mutually unbalanced magnetic fields between the housing and the moveable core that attract and/or repel each other in sustained mutual unbalance in the at least one of the open degrees of freedom to thereby retentively locate the moveable core in at least one of the resting poses.

* * * * *